United States Patent [19]

Berg et al.

[11] Patent Number: 4,753,174
[45] Date of Patent: Jun. 28, 1988

[54] RAILWAY VEHICLE BOLSTER WITH INTEGRAL AND BRAKE SYSTEM CAR RESERVOIR

[75] Inventors: Norman A. Berg, Wheaton; Eugene S. Stein, Lansing, both of Ill.

[73] Assignee: AMSTED Industries Incorporated, Chicago, Ill.

[21] Appl. No.: 78,892

[22] Filed: Jul. 29, 1987

[51] Int. Cl.⁴ ............................................... B61F 1/00
[52] U.S. Cl. ............................ 105/226; 105/463.1; 303/85
[58] Field of Search ............ 105/226, 229, 230, 463.1; 303/1, 85

[56] References Cited

U.S. PATENT DOCUMENTS 4,311,098  1/1982  Irwin ................................... 105/226
4,342,266  8/1982  Cooley .................................. 105/226

Primary Examiner—Ronald C. Capossela
Attorney, Agent, or Firm—Charles E. Bouton; Edward J. Brosius

[57] ABSTRACT

A railway vehicle bolster having an air brake system air reservoir formed integrally in a cavity defined by a top web and side walls of said bolster by enclosing the cavity with end walls and a bottom wall. Air inlet and outlet means provide communication between the air brake system and the reservoir.

7 Claims, 1 Drawing Sheet

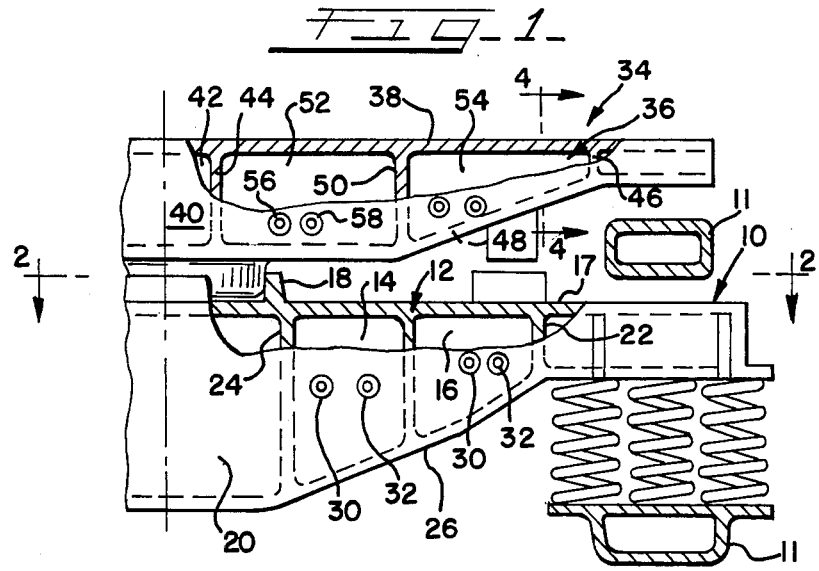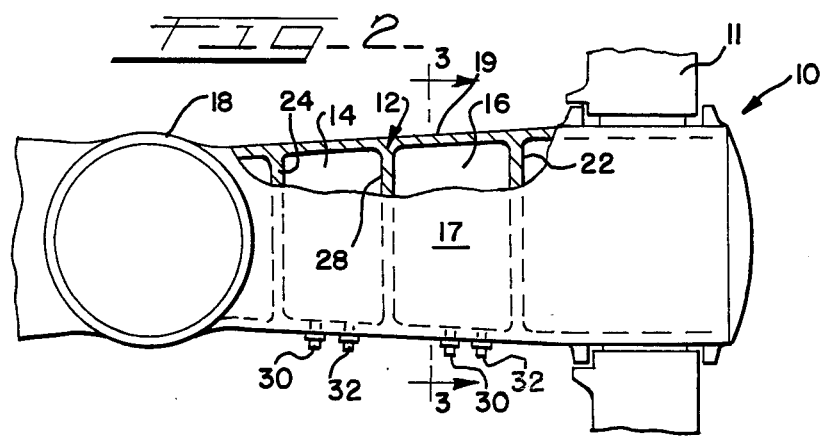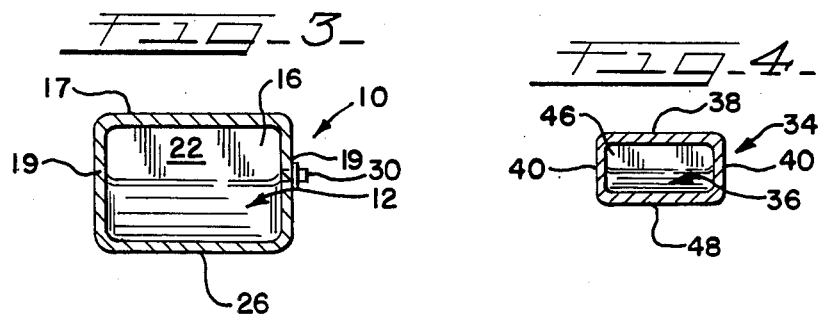

RAILWAY VEHICLE BOLSTER WITH INTEGRAL AND BRAKE SYSTEM CAR RESERVOIR

FIELD OF THE INVENTION

The present invention relates to railway vehicles and more particularly a new and novel cast bolster construction incorporating a pressurized air reservoir therein.

BACKGROUND OF THE INVENTION

Air brake systems for railway cars generally require an air reservoir or tank for supplying air under pressure to the brake components for actuating the latter between operative and inoperative positions. Heretofore such air reservoirs have been constructed as a separate unit and attached on the underframe of the railway car. These prior art reservoirs normally include an auxiliary pressure compartment and an emergency pressure compartment. The resulting structure of these self-contained air brake air reservoirs required considerable space on the underframe for mounting thereon. At the same time the reservoirs structure added to the overall weight of the car and also expense to manufacture.

SUMMARY OF THE PRESENT INVENTION

By the present invention it is proposed to provide an air reservoir, for an air brake system or the like, which is incorporated into an existing structural component of the railway car in a manner such that the space requirements of the reservoir are overcome.

Railway cars conventionally include lengthwise spaced body bolsters structurally attached to the underside of the car body inwardly from the ends thereof. The body bolsters are supported at center plates upon truck bolsters which, in turn, are supported on sideframes and wheels. The body bolster and the truck bolster are conventionally made as castings and include cavities between side walls depending from a generally horizontally disposed horizontal web.

The air reservoir of the present invention is integrally incorporated in the cast bolster structure with the top web and depending side walls forming walls of the reservoir. End walls and a bottom wall are provided to complete the air reservoir enclosure. Suitable air inlet and outlet openings are provided in the exterior walls of the reservoir for charging and discharging air from the reservoir chamber defined by the walls.

The reservoir may be formed in either or both the body bolster or the truck bolster.

The reservoirs thus formed in the bolsters reduces the weight of the truck and/or the underframe and also maintains a more obstruction free underframe. The fact that the reservoir may be formed simultaneously with the casting of the bolster also materially reduces the cost of the air brake system.

Further features and advantages of the invention may be made out from the following detailed description of a preferred embodiment.

BRIEF DESCRIPTION OF THE DRAWINGS

FIG. 1 is a fragmentary side elevational view of a railway car body bolster and truck bolster embodying air reservoirs of the present invention with some of parts broken away to show underlying details of structure;

FIG. 2 is a fragmentary top plan view of the truck bolster taken at line 2—2 of FIG. 1 with parts being broken away to show underlying details of structure;

FIG. 3 is a cross sectional view taken generally along the line 3—3 of FIG. 2; and FIG. 4 is a cross-sectional view taken generally along the line 4—4 of FIG. 1.

DESCRIPTION OF THE PREFERRED EMBODIMENTS

Referring now to FIGS. 1-3 there is shown a truck bolster 10 which is adapted to be supported at each end on springs carried by side frames 11 (partially shown) of railway vehicle truck (not shown). The truck bolster 10 is symmetrical about the truck longitudinal center line with the exception that at least one end, as shown, is provided with an air reservoir 12.

The air reservoir 12 may include a pair of side by side chambers which contain respectively auxiliary air pressure and emergency air pressure for actuating the railway vehicle brakes, and the like, in the conventional manner.

The truck bolster 10 is made from cast metal such as cast steel and includes a female center bowl 18 which receives a complementary center plate of a body bolster and center sill (not shown) of a car body underframe. As shown in FIGS. 1-3, the truck bolster includes a top web 17 with depending side walls 19 defining a cavity 20.

In accordance with the present invention the cavity 20 on one side to the bolster 10 is used to provide the air reservoir chambers 14 and 16 for the air brake system. To this end, as shown, the truck bolster casting includes an outer end wall 22 and an inner end wall 24 adjacent the center bowl structure 18. A bottom wall 26 extends between the inner and outer end walls 22 and 24 and across the side walls 19 to complete the air reservoir 12. A partitioning wall 28 is included to divide the air reservoir or chamber into the auxiliary air pressure chamber 14 and an emergency air pressure chamber 16.

The chambers 14 and 16 may each be provided with an inlet port 30 and an outlet port 32 for connection to the pressurized air source and the air brake system (neither shown) and its operating components in a well known manner. As shown the end walls 22 and 24 and the bottom wall 26 are formed integral with the bolster top web or wall 17 and bolster side walls 19.

The chambers 14 and 16 must be sealed and of a wall strength adequate to withstand the substantial pressure required in rail car brake systems, and the like. To that end it is permissible and desirable to coat the interior of the cavities with a sealant composition. Also the cavities are of a volumetric size sufficient to meet the needs of such an air brake system.

Referring now to FIGS. 1 and 4, a body bolster 34 is provided with an air brake system reservoir 36. The body bolster 34 includes a top web 38 from which there depends spaced side walls 40 defining a cavity 42. Enclosing the cavity 42 to form an air reservoir 36 is an inner end wall 44 and an outer end wall 46. A bottom wall 48 extends across the lower edges of the end wall 44 and 46 and the side walls 40 to form the air reservoir 36. The reservoir 36 may be provided with a partitioning wall 50 extending between the top web 38, bottom web 48 and the side walls 40 to define an auxiliary air pressure chamber 52 and an emergency air pressure chamber 54. Air inlet and air outlet ports 56 and 58 respectively may provide to communicate with each chamber 52 and 54 and to appropriate air compressor and brake system (not shown) as with chambers 14 and 16 of the truck bolster 10.

The foregoing detailed description has been given for clearness of understanding and to provide a complete description of preferred embodiments of the invention. Various modifications may be made without departing from the spirit and scope of the invention which is defined in the following claims.

What is claimed is:

1. A railway vehicle bolster comprising a metal casting including a top web;
   spaced side walls depending from said top web and defining a bolster cavity;
   spaced end walls extending between said side walls and said top web;
   a bottom wall extending between said side walls and said end walls;
   said end walls and said bottom wall defining a reservoir in said bolster cavity for storing air under pressure; and
   inlet and outlet means for communicating with said reservoir.

2. The railway vehicle bolster as defined in claim 1 wherein said end walls and said bottom wall are integrally attached to each other and to said top web and said side walls.

3. The invention as defined in claim 1 wherein said bolster is a truck bolster having a female center bowl; and said reservoir is formed outboard of said center bowl.

4. The invention as defined in claim 3 where said bolster is a body bolster having a male center plate; and said reservoir is formed outboard of said center plate.

5. The invention as defined in claim 1 wherein a partitioning wall is disposed between said end walls to divide said reservoir into an auxiliary air chamber and an emergency air chamber.

6. The invention as defined in claim 1 wherein said reservoir is adequately sized and seal d to contain air under pressure sufficient to operate a rail car air brake system.

7. The invention of claim 6 wherein the interior surfaces of said reservoir are coated with a sealant.

* * * * *